(12) United States Patent
Minamoto

(10) Patent No.: US 8,878,989 B2
(45) Date of Patent: Nov. 4, 2014

(54) DIVIDED IMAGE CIRCUIT, COMMUNICATION SYSTEM, AND METHOD OF TRANSMITTING DIVIDED IMAGE

(71) Applicant: Sony Corporation, Tokyo (JP)

(72) Inventor: Junichi Minamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/156,701

(22) Filed: Jan. 16, 2014

(65) Prior Publication Data

US 2014/0211094 A1 Jul. 31, 2014

(30) Foreign Application Priority Data

Jan. 28, 2013 (JP) .................................. 2013-013459

(51) Int. Cl.
*H04N 5/38* (2006.01)
*H04N 7/01* (2006.01)
*H04N 5/66* (2006.01)

(52) U.S. Cl.
CPC ...................................... *H04N 5/38* (2013.01)
USPC .......................... 348/383; 348/723; 348/426.1

(58) Field of Classification Search
CPC ................ H04L 29/06; H04L 12/2801; H04L 29/06088; H04N 7/12; H04N 7/0155; H04N 7/127
USPC ............. 348/383, 385.1, 388.1, 426.1, 427.1, 348/429.1, 432.1, 437.1, 438.1, 218.1, 723; 375/240; 370/431
See application file for complete search history.

(56) References Cited

U.S. PATENT DOCUMENTS

| | | | | | |
|---|---|---|---|---|---|
| 4,654,484 | A | * | 3/1987 | Reiffel et al. | 348/14.13 |
| 4,660,096 | A | * | 4/1987 | Arlan et al. | 386/326 |
| 4,903,125 | A | * | 2/1990 | Parker | 375/240.01 |
| 4,999,710 | A | * | 3/1991 | Senso et al. | 348/458 |
| 5,392,071 | A | * | 2/1995 | Richards et al. | 375/240.11 |
| 5,430,486 | A | * | 7/1995 | Fraser et al. | 348/426.1 |
| 5,481,306 | A | * | 1/1996 | Senso et al. | 348/383 |
| 6,674,796 | B1 | * | 1/2004 | Haskell et al. | 375/240.01 |
| 7,965,311 | B2 | * | 6/2011 | Oura | 348/38 |
| 2005/0174482 | A1 | * | 8/2005 | Yamada et al. | 348/383 |
| 2005/0281296 | A1 | * | 12/2005 | Yamashita | 370/537 |
| 2007/0200948 | A1 | * | 8/2007 | Kim et al. | 348/385.1 |
| 2007/0263937 | A1 | * | 11/2007 | Rizko | 382/232 |
| 2010/0149412 | A1 | * | 6/2010 | Yamashita | 348/443 |

FOREIGN PATENT DOCUMENTS

JP 2009-200960 9/2009

* cited by examiner

*Primary Examiner* — Victor Kostak
(74) *Attorney, Agent, or Firm* — Dentons US LLP

(57) ABSTRACT

An image transmitting circuit includes: an image supply section configured to supply respective pixels arranged in a predetermined direction in an original image configured of pixels arranged two-dimensionally in a matrix; an image mapping section configured to map respective dividing number of the pixels onto different images and thereby to generate divided images every time the dividing number of pixels are supplied to the image mapping section, the dividing number being a number into which the original image is divided; and transmitting sections of the dividing number or more each corresponding to one of a plurality of communication channels and configured to transmit one of the divided images via the corresponding communication channel.

8 Claims, 14 Drawing Sheets

122

| RESOLUTION FORMAT INDENTIFICATION INFORMATION | HORIZONTAL RESOLUTION (PIXEL) | VERTICAL RESOLUTION (LINE) | FRAME RATE (Hz) | HORIZONTAL BLAKING PERIOD (PIXEL) | VERTICAL BLAKING PERIOD (LINE) |
|---|---|---|---|---|---|
| RF1 | 1920 | 1080 | 24 | 280 | 45 |
| ⋮ | ⋮ | ⋮ | ⋮ | ⋮ | ⋮ |
| RF10 | 3840 | 2160 | 24/1.001 | 512 | 502 |
| RF11 | 3840 | 2160 | 24 | 512 | 502 |
| ⋮ | ⋮ | ⋮ | ⋮ | ⋮ | ⋮ |

FIG. 13

DIVIDED IMAGE CIRCUIT, COMMUNICATION SYSTEM, AND METHOD OF TRANSMITTING DIVIDED IMAGE

CROSS REFERENCE TO RELATED APPLICATIONS

This application claims the benefit of Japanese Priority Patent Application JP 2013-013459 filed Jan. 28, 2013, the entire contents of each which are incorporated herein by reference.

BACKGROUND

The present technology relates to an image transmitting circuit, to an image receiving circuit, to a communication system, and to a method of transmitting an image. Specifically, the present technology relates to an image transmitting circuit that transmits an image, to an image receiving circuit that receives an image, to a communication system that transmits and receives an image, and to a method of transmitting an image.

In recent years, a communication system, an image receiving apparatus, and the like that process a super high definition image that has definition higher than that of an HD (High Definition) image has been desired. According to the needs, the international association has standardized the UHDTV (Ultra High Definition TV) standard for processing an image having number of pixels four times or sixteen times that of the HD image. For transferring the super high definition image, for example, an interface in accordance with the SMPTE (Society of Motion Picture and Television Engineers) standard is used. For example, an interface of the 3G-SDI standard compliant with the SMPTE standard is used for productions for broadcasting business, and an interface of the HDMI (High Definition Multimedia Interface) standard is used for productions for consumers.

A transmission rate per channel of the above-mentioned interfaces has an upper limit based on the standard. Therefore, an image having resolution higher than that of the HD image may not be transmitted via one channel. Accordingly, in the case where it is not possible to transmit the image via one channel, the image is divided and is transmitted via a plurality of channels.

The image is divided, for example, by a mapping method in which the image is sectioned by center lines in horizontal and vertical directions, and thereby, is divided into four sections. Alternatively, a mapping method in which some lines and pixels are taken from the image may be used (for example, see Japanese Unexamined Patent Application Publication No. 2009-200960). When some lines and pixels are taken from the image, odd-numbered or even-numbered lines are taken in the horizontal direction, and one of two adjacent pixels in each of the taken lines is taken. The taken pixel is mapped onto a divided image.

SUMMARY

In the above-described related art, it is difficult to reduce delay time and memory capacity. In the mapping method in which the image is sectioned by the center lines, it is necessary to store the whole of the image in a memory that is capable of holding the whole of the image, and to read divided images from the memory. This causes delay time corresponding to about one frame. Also, in the method in which some lines and pixels are taken from the image, it is necessary to store the lines to be taken in a memory that is capable of holding about one line, and to read a pixel to be taken from the held line. This causes delay time corresponding to about one line.

In order to reduce memory capacity and delay time, a transmission rate per channel may be increased to transmit the image without dividing the image. However, in the HDMI standard, the 3G-SDI standard, or the like, pixel data is transmitted sequentially in a serial way. Therefore, it is difficult to improve a transfer clock in channel, and accordingly, is not easy to improve the transmission rate. Therefore, it is difficult to reduce delay time and memory capacity.

It is desirable to reduce delay time and memory capacity in a system that transmits an image.

According to an embodiment of the present technology, there is provided an image transmitting circuit including: an image supply section configured to supply respective pixels arranged in a predetermined direction in an original image configured of pixels arranged two-dimensionally in a matrix; an image mapping section configured to map respective dividing number of the pixels onto different images and thereby to generate divided images every time the dividing number of pixels are supplied to the image mapping section, the dividing number being a number into which the original image is divided; and transmitting sections of the dividing number or more each corresponding to one of a plurality of communication channels and configured to transmit one of the divided images via the corresponding communication channel. This achieves an effect that the respective dividing number of pixels are mapped onto different images to be transmitted by the dividing number or more transmitting sections.

The image transmitting circuit according to the above-described embodiment may further include a dividing number determination section configured to determine the dividing number based on communication speed of the communication channel and a data amount of the original image. The image mapping section may generate the divided images of the determined dividing number. Only the determined dividing number of the transmitting sections out of the dividing number or more transmitting sections may transmit the divided images. This achieves an effect that the divided images are transmitted only by the dividing number of transmitting sections out of the dividing number or more transmitting sections.

The image transmitting circuit according to the above-described embodiment may further include synchronization signal multiplex sections of the number of the transmitting sections, the synchronization signal multiplex sections each being corresponding to one of the transmitting sections, and being configured to multiplex a synchronization signal onto the divided image and to transmit the multiplexed synchronization signal and the divided image to the corresponding transmitting section. Only the determined dividing number of the synchronization signal multiplex sections out of the synchronization signal multiplex sections of the number of the transmitting sections may multiplex the synchronization signal. This achieves an effect that the synchronization signals are multiplexed by the respective dividing number of synchronization signal multiplex sections.

In the image transmitting circuit according to the above-described embodiment, the dividing number determination section may determine a number into which the original image is equally divided and that is not over the number of the communication channels as the dividing number, based on the communication speed and the data amount of the original image. This achieves an effect that the number into which the original image is equally divided and that is not over the number of the communication channels is determined as the dividing number based on the communication speed and the data amount of the original image.

According to an embodiment of the present technology, there is provided an image receiving circuit including: receiving sections of a dividing number or more each corresponding to one of a plurality of communication channels, the receiving sections each being configured to receive pixels in one of the dividing number of divided images on one-pixel basis via the corresponding communication channel, the dividing number being a number into which an original image configured of pixels arranged two-dimensionally in a matrix is divided; an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image; and a display section configured to display the reconfigured original image. This achieves an effect that respective pixels received by the receiving sections are sequentially arranged in a predetermined direction to reconfigure the original image every time the pixels in one of the divided images are received by the dividing number or more receiving sections.

The image receiving circuit according to the above-described embodiment may further include a dividing number determination section configured to determine the dividing number based on communication speed of the communication channel and a data amount of the original image. The determined dividing number of the receiving sections out of the dividing number or more receiving sections each may receive pixels in one of the divided images on one-pixel basis. The image reconfiguration section may reconfigure the original image every time each of the determined dividing number of receiving sections acquires one pixel. This achieves an effect that the divided image is received by the determined number of receiving sections out of the dividing number or more receiving sections.

The image receiving circuit according to the above-described embodiment may further include synchronization signal separation sections of the number of the receiving sections, the synchronization signal separation sections each being configured to separate a synchronization signal from the divided image, and to supply the divided image from which the synchronization signal is separated to the image reconfiguration section. Each of the receiving sections may correspond to one of the synchronization signal separation sections, may receive the divided image onto which the synchronization signal is multiplexed, and may supply the received divided image to the corresponding synchronization signal separation section. Only the determined dividing number of the synchronization signal separation sections out of the synchronization signal separation sections of the number of the receiving sections may separate the synchronization signal. This achieves an effect that the divided images are separated by the determined dividing number of synchronization signal separation section out of the synchronization signal separation sections of the number of the receiving sections.

In the image receiving circuit according to the above-described embodiment, the dividing number determination section may determine a number into which the original image is equally divided and that is not over the number of the communication channels as the dividing number, based on the communication speed and the data amount of the original image. This achieves an effect that the number into which the original image is equally divided and that is not over the number of the communication channels is determined as the dividing number, based on the communication speed and the data amount of the original image.

According to another embodiment of the present technology, there is provided a communication system including: an image supply section configured to supply respective pixels arranged in a predetermined direction in an original image configured of pixels arranged two-dimensionally in a matrix; an image mapping section configured to map respective dividing number of the pixels onto different images and thereby to generate divided images every time the dividing number of pixels are supplied to the image mapping section, the dividing number being a number into which the original image is divided; transmitting sections of the dividing number or more each corresponding to one of a plurality of communication channels and configured to transmit one of the divided images via the corresponding communication channel; receiving sections of the dividing number or more each corresponding to one of the plurality of communication channels, the receiving sections each being configured to receive pixels in one of the divided images on one-pixel basis via the corresponding communication channel; an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image; and a display section configured to display the reconfigured original image. This achieves an effect that the respective dividing number of pixels are mapped onto different images to be transmitted by the dividing number or more transmitting sections and received by the dividing number or more receiving sections.

According to another embodiment of the present technology, there is provided a method of transmitting an image, the method including: through an image supply section, supplying each of pixels arranged in a predetermined direction in an original image configured of pixels arranged two-dimensionally in a matrix; through an image mapping section, mapping respective dividing number of pixels onto different images and thereby generating divided images every time the dividing number of pixels are supplied to the image mapping section, the dividing number being a number into which the original image is divided; and through transmitting sections of the dividing number or more each corresponding to one of a plurality of communication channels, transmitting one of the divided images via the corresponding communication channel. This achieves an effect that the respective dividing number of pixels are mapped onto different images to be transmitted by the dividing number or more transmitting sections.

According to the above-described embodiments of the present technology, it is possible to achieve a favorable effect of reducing delay time and memory capacity in the system that transmits an image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 13 is a diagram illustrating a configuration example of a resolution format table in the second embodiment.

DETAILED DESCRIPTION

Some embodiments of the present technology will be described below. The description will be given in the following order.
1. First Embodiment (An example in which the respective dividing number of pixels are mapped onto different images to be transmitted)
2. Second Embodiment (An example in which the respective dividing number of pixels are mapped onto different images to be transmitted, where the dividing number is based on a data amount of an image)

1. First Embodiment

Configuration Example of Communication System

Figure 1:
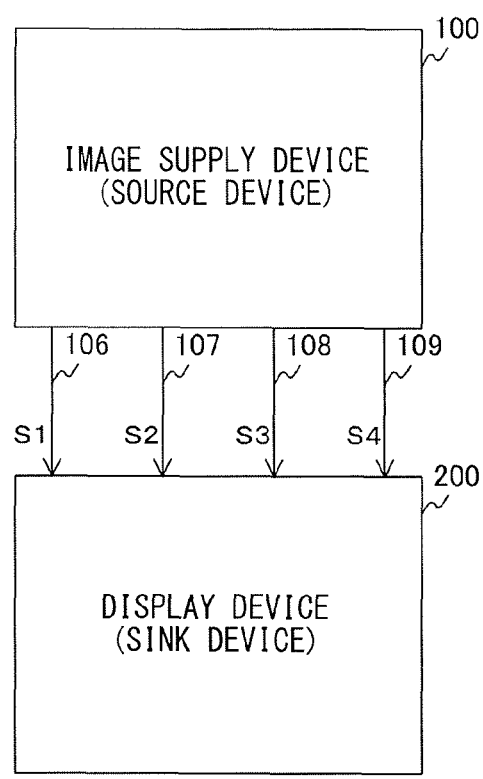
FIG. 1 is a block diagram illustrating a configuration example of a communication system in a first embodiment.

FIG. 1 is a block diagram illustrating a configuration example of a communication system in an embodiment of the present technology. The communication system includes an image supply device 100 and a display device 200.

The image supply device 100 supplies a picture signal to the display device 200, and is used as a source device in the communication system. More specifically, the image supply device 100 may be, for example, a recorder, a television tuner, or the like. In this example, the picture signal includes a plurality of original image signals in a time-series manner. The original image signal represents an original image configured of a plurality of pixels arranged two-dimensionally in a matrix. The image supply device 100 may include, for example, a memory device such as a HDD (Hard Disk Drive), and may read the picture signal from the memory device. It is to be noted that the image supply device 100 may acquire the picture signal by a method other than reading from the memory device. For example, the image supply device 100 may receive an RF (Radio Frequency) signal including a picture signal, and may acquire the picture signal from the RF signal.

In this example, it is assumed that a data amount per unit time of the picture signal is too large to transmit in real-time via one cable compliant with the SMPTE standard. For example, the picture signal may be a picture signal with extremely-high resolution such as a QFHD (Quad Full High Definition) signal. The image supply device 100 equally divides each of the original image signals in the acquired picture signal into a number that is not over the number of communication channels (for example, the number of cables) between the image supply device 100 and the display device 200. The signal obtained by equally dividing the original image signal will be hereinafter referred to as "divided image signal", and an image represented by the divided image signal will be hereinafter referred to as "divided image". The image supply device 100 converts the divided image signals into serial data S1 to serial data S4. The serial data S1, the serial data S2, the serial data S3, and the serial data S4 are transmitted to the display device 200 via cables 106, 107, 108, and 109, respectively. The cables 106 to 109 may be, for example, 3G-SDI cables, and the serial data is transmitted in accordance with the 3G-SDI standard. Transmission bands of the respective cables are assumed to be the same. It is to be noted that the image supply device 100 is a specific but not limitative example of "image transmitting circuit" of the present technology. The image supply device 100 may transmit a picture signal in accordance with a standard other than the 3G-SDI standard such as the HDMI standard as long as the image supply device 100 is capable of transmitting a picture signal. Also, the cables 106 to 109 may be cables other than the 3G-SDI cables, for example, HDMI cables.

It is to be noted that, although the image supply device 100 divides the original image into four divided images, the dividing number is not limited to four. The dividing number may be any number in a range that is not over the number of the cables as long as the data amount per unit time of the divided image signal is substantially transmittable via one cable and the original image is divided equally thereby. For example, when horizontal resolution of the original image is 3840 pixels, the original image may be equally divided into two or six divided images other than four divided images in consideration of a frame rate by which the above-described image is displayed for one second.

Although the high-definition picture signal such as QFHD picture signal is targeted for division, the image supply device 100 may divide an image signal that has resolution which is not high, for example, an HD (High Definition) image signal. Even the resolution is not high, the data amount per unit time of the picture signal is improved when the frame rate is extremely high, and therefore, the picture signal may not be transmitted via one channel.

The display device 200 receives the picture signal and displays a picture. The display device 200 is used as a sink device that reconfigures an image in synchronization with the source device in the communication system. The display device 200 receives the serial data S1 to S4 via the cables 106, 107, 108, and 109, and converts the serial data S1 to S4 into divided image signals D1 to D4, respectively. Further, the display device 200 synthesizes the divided image signals D1 to D4, and thereby, reconfigures the original image signal before being divided. The display device 200 performs an image processing on the reconfigured original image signal as necessary, and displays the processed image. It is to be noted that the display device 200 is a specific but not limitative example of "image receiving circuit" of the present technology.

[Configuration Example of Image Supply Device]

Figure 2:
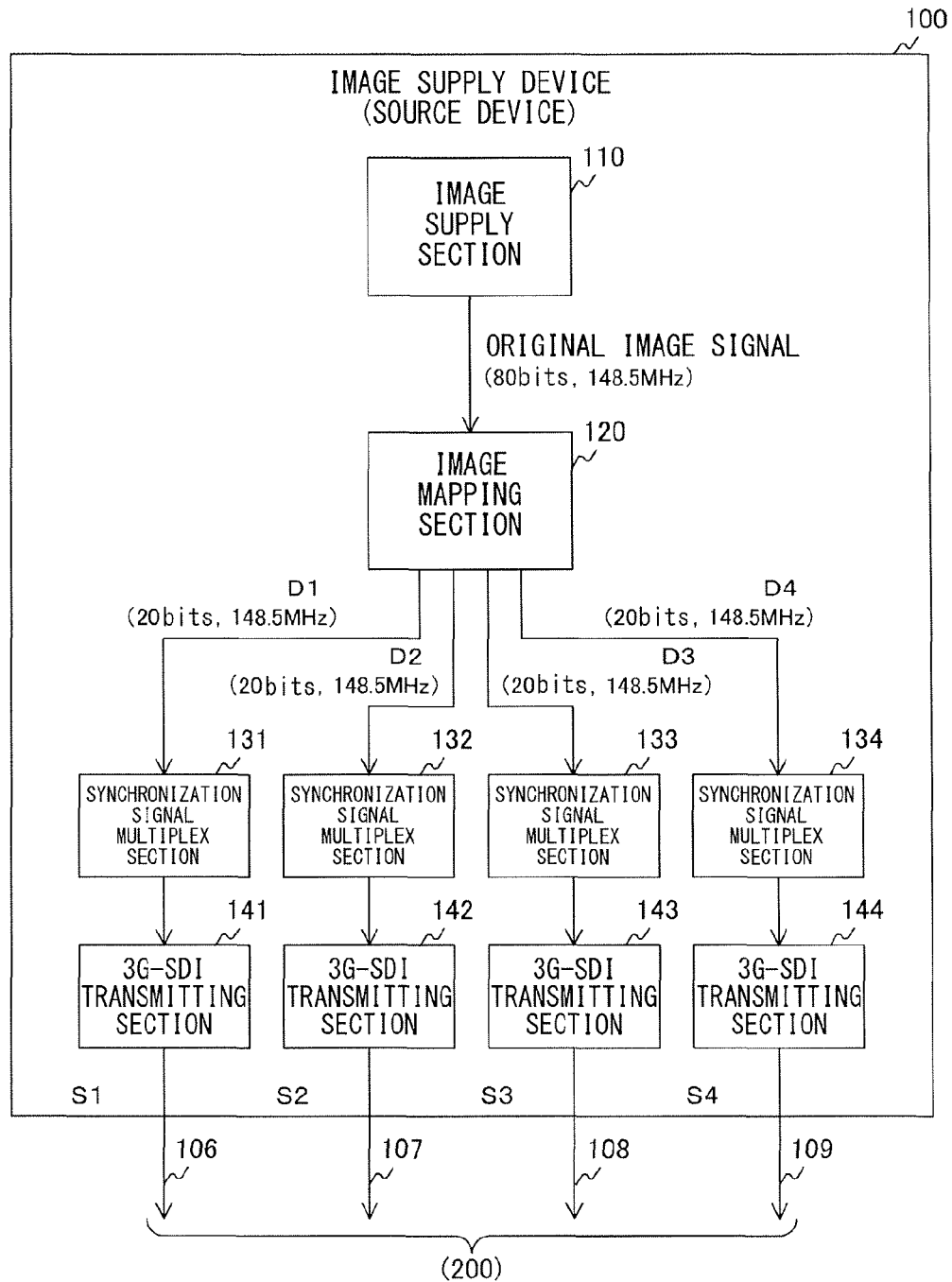
FIG. 2 is a block diagram illustrating a configuration example of an image supply device in the first embodiment.

FIG. 2 is a block diagram illustrating a configuration example of the image supply device 100 in the first embodiment. The image supply device 100 includes an image supply section 110, an image mapping section 120, synchronization signal multiplex sections 131, 132, 133, and 134, and 3G-SDI transmitting sections 141, 142, 143, and 144. The number of the synchronization signal multiplex sections (such as the synchronization signal multiplex section 131) to be provided and the number of the 3G-SDI transmitting sections (such as the 3G-SDI transmitting section 141) to be provided are the same as the number of the communication channels (for example, the number of cables) between the image supply device 100 and the display device 200. When the number of the communication channels is other than four, the number of the synchronization signal multiplex sections (such as the synchronization signal multiplex section 131) and the number of the 3G-SDI transmitting sections (such as the 3G-SDI transmitting section 141) are changed to be the same as the number of the communication channels.

The image supply section 110 acquires the original image signal, and supplies the acquired original image signal to the image mapping section 120. The image supply section 110 may sequentially select lines in the original image in order of scanning at the time of raster scanning, for example. The image supply section 110 transfers, to the image mapping section 120, a group of pixels configured of a (kn+1)th pixel, a (kn+2)th pixel, ..., (kn+j)th pixel, ..., and a (kn+k)th pixel in the selected line. "k" is the number into which the original image is divided, and is the number (for example, "4") that is not over the number of the communication channels between the image supply device 100 and the display device 200. "n" is a value based on the number of times to transfer the group of pixels in the line, and is an integer of 0 or larger. "j" is an integer from 1 to k. When k is 4, pixels to be transferred at the first time (n=0) are the 1st to 4th pixels in the same line. Further, pixels to be transferred at the second time (n=1) are the 5th to 8th pixels in the same line. After the image supply section 110 has supplied all of the pixels in the selected line, the image supply section 110 selects the next line in order of raster scanning, and performs a similar processing on the selected line.

The image supply section 110 transfers the pixels on k-number of pixel basis. As a result, the pixels are transferred at a transfer rate lower than a transfer rate in a case where the pixels are transferred on one-pixel basis. For example, when k=4, the pixel clock of the original image signal before being divided may be 594 (=148.5×4) MHz, for example. In this case, the image supply section 110 transfers the pixels on four-pixel basis. Therefore, it is enough that the pixels are transferred at a transfer rate of 148.5 MHz which is ¼ of the pixel clock. When the data size of one pixel is 20 bits, data of 80 bits is transferred at the transfer rate of 148.5 MHz.

Also, by transferring the pixels on k-number of pixel basis, the image mapping section 120 is allowed to collectively process the k-number of pixels. Therefore, it is not necessary to provide a memory for holding the k-number of pixels in the image mapping section 120.

The image mapping section 120 maps the respective k-number of pixels onto divided images different from one another every time the k-number of pixels are supplied to the image mapping section 120.

Specifically, the image mapping section 120 maps the (kn+j)th pixel in a line having line number L in the original image as the (n+1)th pixel in a line having the line number L in the j-th divided image. The line number is a unique number allocated to a line in the image. For example, when k=4, the 1st pixel in the line having the line number L in the original image is mapped as the 1st pixel in a line having the line number L in the 1st divided image. The 2nd pixel in the line having the line number L is mapped as the 1st pixel in the line having the line number L in the 2nd divided image. Similarly, the 3rd pixel is mapped as the 1st pixel in the same line in the 3rd divided image, and the 4th pixel is mapped as the 1st pixel in the same line in the 4th divided image. The 5th, 6th, 7th, and 8th pixels are mapped as the 2nd pixels in the same line in the respective divided images.

The function of the image mapping section 120 may be achieved, for example, by a distributor. The distributor distributes the k-number of pixels to the synchronization signal multiplex sections (such as the synchronization signal multiplex section 131) different from one another every time the k-number of pixels are supplied to the distributor. The j-th pixel in the k-number of pixels is supplied to the j-th synchronization signal multiplex section out of the k-number of synchronization signal multiplex sections by the distributor. Thus, the original image is divided into the k-number of divided images.

The divided image is transferred at a transfer rate (for example, 145.8 MHz) same as the transfer rate of the original image. It is to be noted that the original image is transferred on k-number of pixel basis (for example, on four-pixel basis), but on the other hand, the divided image is transferred on one-pixel basis. When the data size of one pixel is 20 bits, data of 20 bits is transferred at the transfer rate of 145.8 MHz in the divided image.

The synchronization signal multiplex section 131 multiplexes the synchronization signal onto the divided image signal D1. The synchronization signal multiplex section 131 may generate the synchronization signal, for example, in accordance with the 3G-SDI standard. In the 3G-SDI standard, a TRS (Timing Reference Signal), a line number, an error detection code, and a horizontal blanking signal are attached to each line as the synchronization signal. As the error detection code, a CRC (Cyclic Redundancy Check) is used.

In this example, the TRS includes an EAV (End of Active Video) and an SAV (Start of Active Video). The EAV is a signal that indicates an end timing of a period during which a pixel is valid. The SAV is a signal that indicates a start timing of the period during which the pixel is valid. The horizontal blanking signal is a signal that indicates a horizontal blanking period during which an image is not displayed.

When the original image is divided to be transmitted, it is necessary to transmit, to the display device 200, pixels having the same coordinate in the respective divided images at the same time. Attachment of the TRS signal achieves synchronization of the timings to transmit the pixels in the respective divided image signals.

Due to the mapping method in which the original image is divided on the pixel unit of the k-number of pixels in the horizontal direction, vertical resolution of the divided image becomes the same as vertical resolution of the original image, and horizontal resolution of the divided image becomes 1/k of horizontal resolution of the divided image. Therefore, in a vertical line direction, the synchronization signal multiplex section 131 multiplexes the synchronization signal at a timing same as that of the original image. On the other hand, in a horizontal line direction, the synchronization signal multiplex section 131 multiplexes the synchronization signal at an interval of 1/k of an interval of the original image. Specifically, the synchronization signal multiplex section 131 sets the pixels of 1/k of the number of the pixels in the horizontal direction in the original image as one line, and multiplexes the synchronization signal thereon, every time the pixels of 1/k of the number of the pixels in the horizontal direction in the original image are supplied to the synchronization signal multiplex section 131.

The configurations of the synchronization signal multiplex sections 132, 133, and 134 are similar to that of the synchronization signal multiplex section 131 except that the synchronization signal multiplex sections 132, 133, and 134 multiplex the divided image signals D2, D3, and D4, respectively, instead of the divided image signal D1.

In such a manner, the TRS signals are attached at the same interval in the respective divided image signals. Therefore, the pixels having the same coordinate in the respective divided images are transmitted to the display device 200 at the same time.

The synchronization signal multiplex section 131 supplies the divided pixel signal onto which the synchronization signal is multiplexed as parallel data to the 3G-SDI transmitting section 141. The synchronization signal multiplex sections 132, 133, and 134 supply the multiplexed divided image signals D1, D2, D3, and D4 as parallel data to the 3G-SDI transmitting sections 142, 143, and 144, respectively.

The 3G-SDI transmitting sections 141, 142, 143, and 144 each convert the parallel data into serial data, and transmit the serial data in accordance with the 3G-SDI standard.

The 3G-SDI transmitting section 141 transmits the serial data S1 via the cable 106. The 3G-SDI transmitting sections 142, 143, and 144 transmit the serial data S2, S3, and S4 to the display device 200 via the cables 107, 108, and 109, respectively. It is to be noted that each of the 3G-SDI transmitting sections 141, 142, 143, and 144 is a specific but not limitative example of "transmitting section" of the present technology.

[Configuration Example of Display Device]

Figure 3:
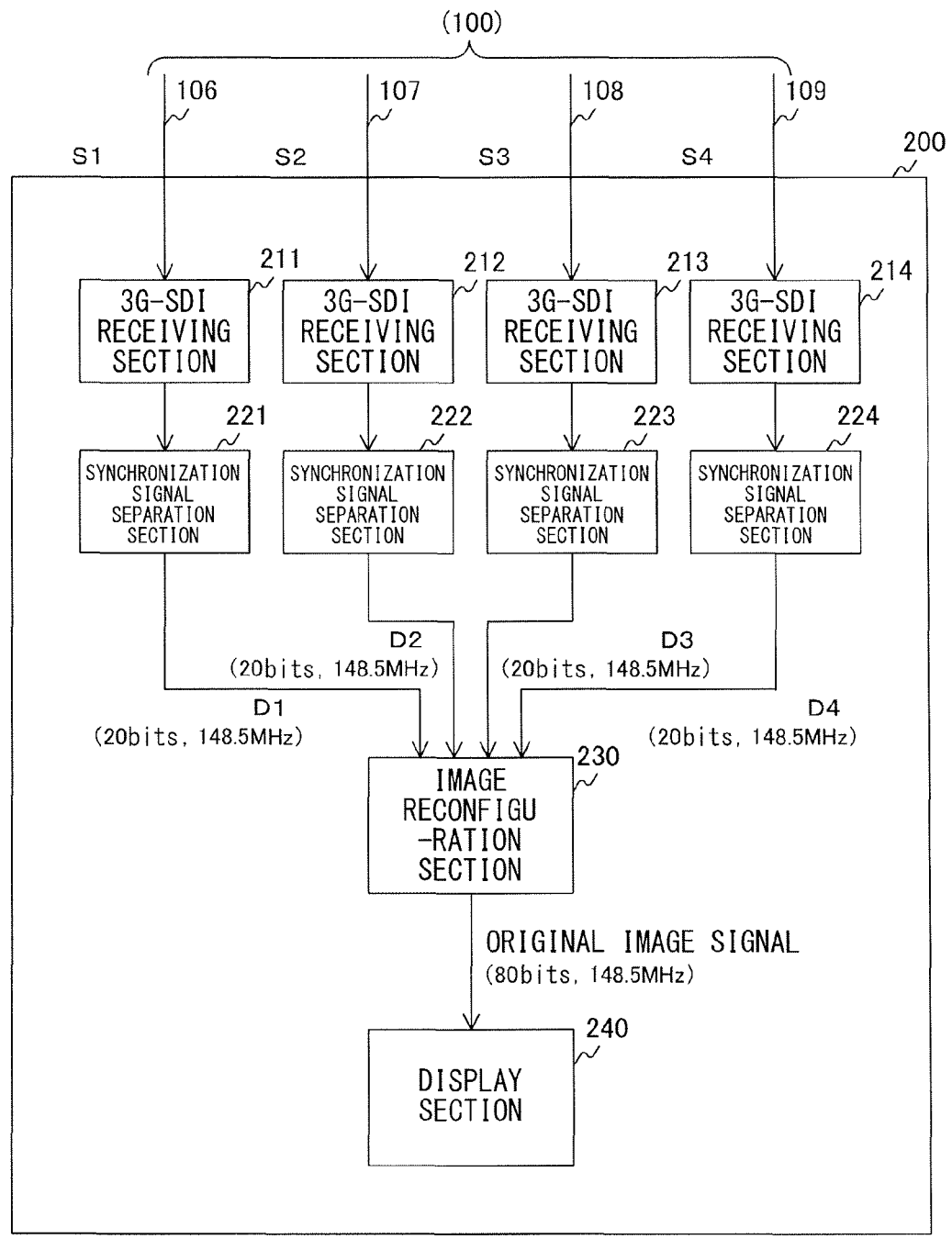
FIG. 3 is a block diagram illustrating a configuration example of a display device in the first embodiment.

FIG. 3 is a block diagram illustrating a configuration example of the display device 200 in the first embodiment. The display device 200 includes 3G-SDI receiving sections 211, 212, 213, and 214, synchronization signal separation sections 221, 222, 223, and 224, and an image reconfiguration section 230, and a display section 240.

The 3G-SDI receiving sections 211, 212, 213, and 214 receive the serial data in accordance with the 3G-SDI standard, and convert the received serial data into parallel data.

The 3G-SDI receiving section 211 receives the serial data S1 via the cable 106, converts the received serial data S1 into parallel data, and supplies the parallel data to the synchronization signal separation section 221. The 3G-SDI receiving sections 212, 213, and 214 receive the serial data S2, S3, and S4 via the cables 107, 108, and 109, convert the serial data S2, S3, and S4 into parallel data, and supply the parallel data to the synchronization signal separation sections 222, 223, and 224. It is to be noted that each of the 3G-SDI receiving sections 211, 212, 213, and 214 is a specific but not limitative example of "receiving section" of the present technology.

The synchronization signal separation section 221 separates the parallel data into the synchronization signal and the divided image signal D1. The synchronization signal separation section 221 synchronizes a supply timing of the divided image signal D1 to the image reconfiguration section 230 based on the separated synchronization signal. Specifically, the synchronization signal separation section 221 sequentially supplies the pixels between the SAV and the EAV as pixels in one line. The TRSs (the SAV and the EAV) are attached at the same interval in the image supply device 100 as described above. Therefore, by supplying the pixels based on the TRSs, the pixels having the same coordinate in the respective divided images are supplied to the image reconfiguration section 230 at the same time.

The synchronization signal separation sections 222, 223, and 224 separate the divided image signals D2, D3, and D4 from the synchronization signals, and supply the separated divided image signals D2, D3, and D4 to the image reconfiguration section 230, respectively.

Every time the k-number of pixels are supplied from the k-number of synchronization signal separation sections (such as the synchronization signal separation section 221) to the image reconfiguration section 230, the image reconfiguration section 230 sequentially arranges the supplied k-number of pixels in a horizontal line in the original image, and reconfigures the original image.

Specifically, the image reconfiguration section 230 arranges the (n+1)th pixel in the line having the line number L in the j-th divided image as the (kn+j)th pixel in the line having the line number L in the original image. For example, when k=4, the 1st (n=0) pixel in the line having the line number L in the 1st divided image is arranged as the 1st pixel in the line having the line number L in the original image. The 1st pixel in the line having the line number L in the 2nd divided image is arranged as the 2nd pixel in the line having the line number L in the original image. Similarly, the 1st pixel in the 3rd divided image is arranged as the 3rd pixel in the same line in the original image, and the 1st pixel in the 4th divided image is arranged as the 4th pixel in the same line in the original image. The 2nd pixels in the respective 1st to 4th divided images are arranged as the 5th to 8th pixels in the same line in the original image.

The function of the image reconfiguration section 230 may be achieved, for example, by a mixer. Every time the k-number of pixels are supplied from the k-number of synchronization signal separation sections (such as the synchronization signal separation section 221) to the mixer, the mixer collectively supplies the supplied k-number of pixels to the display section 240. As a result, the original image is reconfigured from the k-number of divided images.

The image reconfiguration section 230 supplies the reconfigured original image signal to the display section 240. In this example, the divided image signal is transferred on one-pixel basis, and on the other hand, the reconfigured original image signal is transferred on k-number of pixel basis (for example, on four-pixel basis) at the same transfer rate (for example, 148.5 MHz). For example, when the data size of one pixel is 20 bits, data of 80 bits in the original image signal is transferred at the transfer rate of 148.5 MHz. In such a manner, by transferring the pixels on k-number of pixel basis, the pixels are transferred at a transfer rate lower than that in a case where the pixels are transferred on one-pixel basis.

Moreover, if a configuration in which the original image signal is transferred on one-pixel basis is adopted, it is necessary to provide a memory for storing the k-number of pixels supplied at the same time in the image reconfiguration section 230. However, it becomes not necessary to provide such a memory by transferring the pixels on k-number of pixel basis.

The display section 240 displays the original image based on the original image signal. The original image signal is transferred on k-number of pixel basis. Therefore, the display section 240 is allowed to draw the image based on an operation clock same as that of the image supply section 110 in the image supply device 100.

Figure 4:
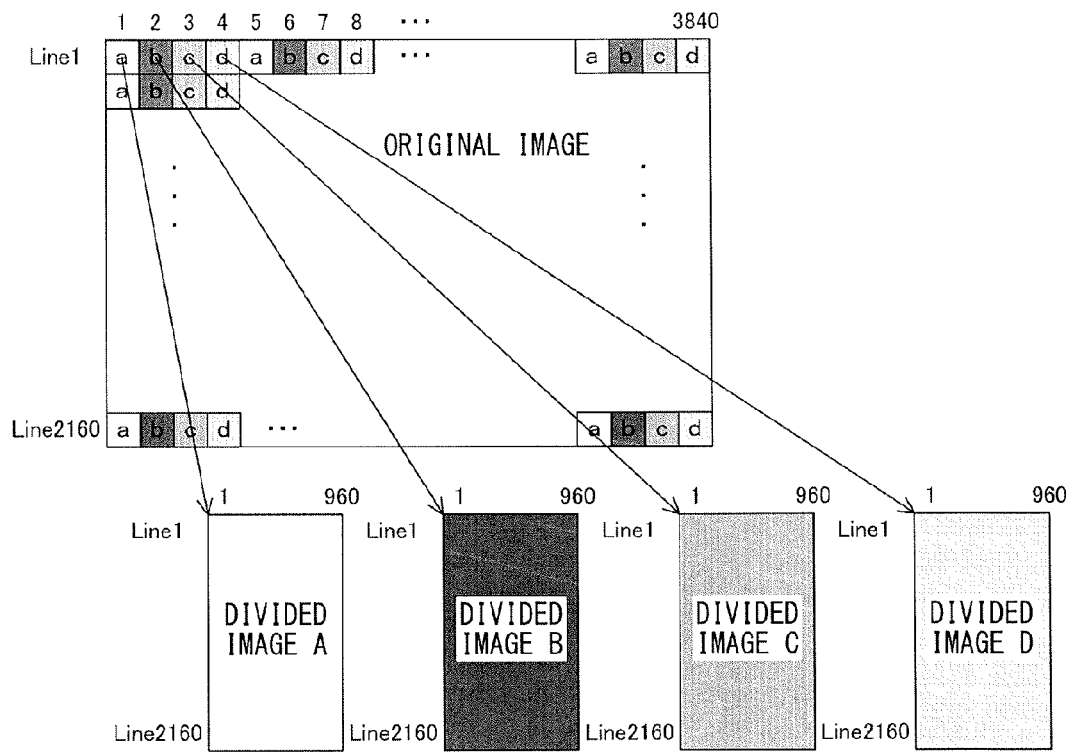
FIG. 4 is a diagram for explaining a mapping method in the first embodiment.

FIG. 4 is a diagram for explaining the mapping method in the first embodiment. In FIG. 4, the original image has the vertical resolution of 2160 lines and the horizontal resolution of 3840 pixels. The dividing number k is 4. Therefore, the original image is divided into four, and four divided images A, B, C, and D are used for mapping.

In this case, the (4n+1)th pixels "a" such as the 1st, 5th, and 9th pixels in each line of the original image are mapped onto the divided image A. The (4n+2)th pixels "b" such as the 2nd, 6th, and 10th pixels in each line of the original image are mapped onto the divided image B. The (4n+3)th pixels "c" in each line are mapped onto the divided image C, and the (4n+4)th pixels "d" in each line are mapped onto the divided image D.

By such a mapping method, the original image is divided into the k-number of divided images each configured of pixels each of which is the one taken from a unit configured of the k-number of pixels in the horizontal direction. Lines are not taken away on line-unit basis in the vertical direction. Therefore, it is not necessary to provide a memory for storing one line or one frame in the image supply device 100. Therefore, delay of line unit or of frame unit does not occur when an image is transmitted.

Figure 5:
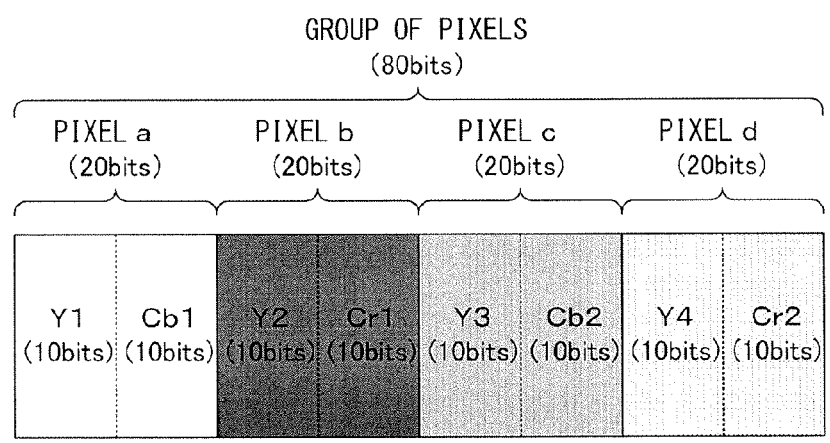
FIG. 5 is a diagram illustrating a data configuration example of pixel data in the first embodiment.

It is to be noted that the resolution of the original image is not limited to the resolution exemplified in FIG. 5. For example, the original image may be an image having the vertical resolution of 2160 lines and the horizontal resolution of 4160 pixels.

FIG. 5 is a diagram illustrating a data configuration example of pixel data in the first embodiment. FIG. 5 is an example of pixel data in a case where a color format of the image signal is "YCbCr 4:2:2". YCbCr indicates a type of color space. In the color space, Y indicates a luminance signal, Cb indicates a blue color-difference signal, and Cr indicates a red color-difference signal. "4:2:2" indicates a ratio of the sampling frequencies of the luminance signal Y, the blue color-difference signal Cb, and the red color-difference signal Cr. In other words, while the luminance signal is sampled for four times, each of the blue color-difference signal Cb and the red color-difference signal Cr is sampled twice. Therefore, the adjacent four pixels a, b, c, and d include four luminance signals Y, two blue color-difference signals Cb, and two red color-difference signals Cr in the horizontal direction.

Typically, data that includes the luminance signal Y, the blue color-difference signal Cb, and the red color-difference signal Cr is transferred as one pixel data. However, in FIG. 5, a configuration in which data that includes the luminance signal Y and either the blue color-difference signal Cb or the red color-difference signal Cr is transferred as one pixel data is adopted. One reason for this is because this makes it easier to control the synchronization signal that achieves consistency of a timing for the pixel signal supplied by the image supply section 110 and a timing for a transmission between the image supply device 100 and the display device 200.

When the gradation bit number of each of the luminance signal and the color-difference signal is 10 bits, a data size of one pixel is 20 bits because one pixel includes one luminance signal and one color-difference signal. Accordingly, a data amount of a pixel group configured of four pixels that are transferred at once is 80 bits.

It is to be noted that data that includes the luminance signal Y, the blue color-difference signal Cb, and the red color-difference signal Cr may be transferred as one pixel data. In this case, the size of each of the blue color-difference signal Cb and the red color-difference signal Cr is the half of the size of the luminance signal Y.

The color format of the image signal is not limited to the configuration exemplified in FIG. 5. For example, a color space of RGB (Red Green Blue) may be used instead of YCbCr. Further, the sampling ratio may be, for example, "4:4:4", "4:2:0", or the like. Further, the gradation bit number may be, for example, 8 bits, 12 bits, 14 bits, or the like, other than 10 bits.

Figure 6:
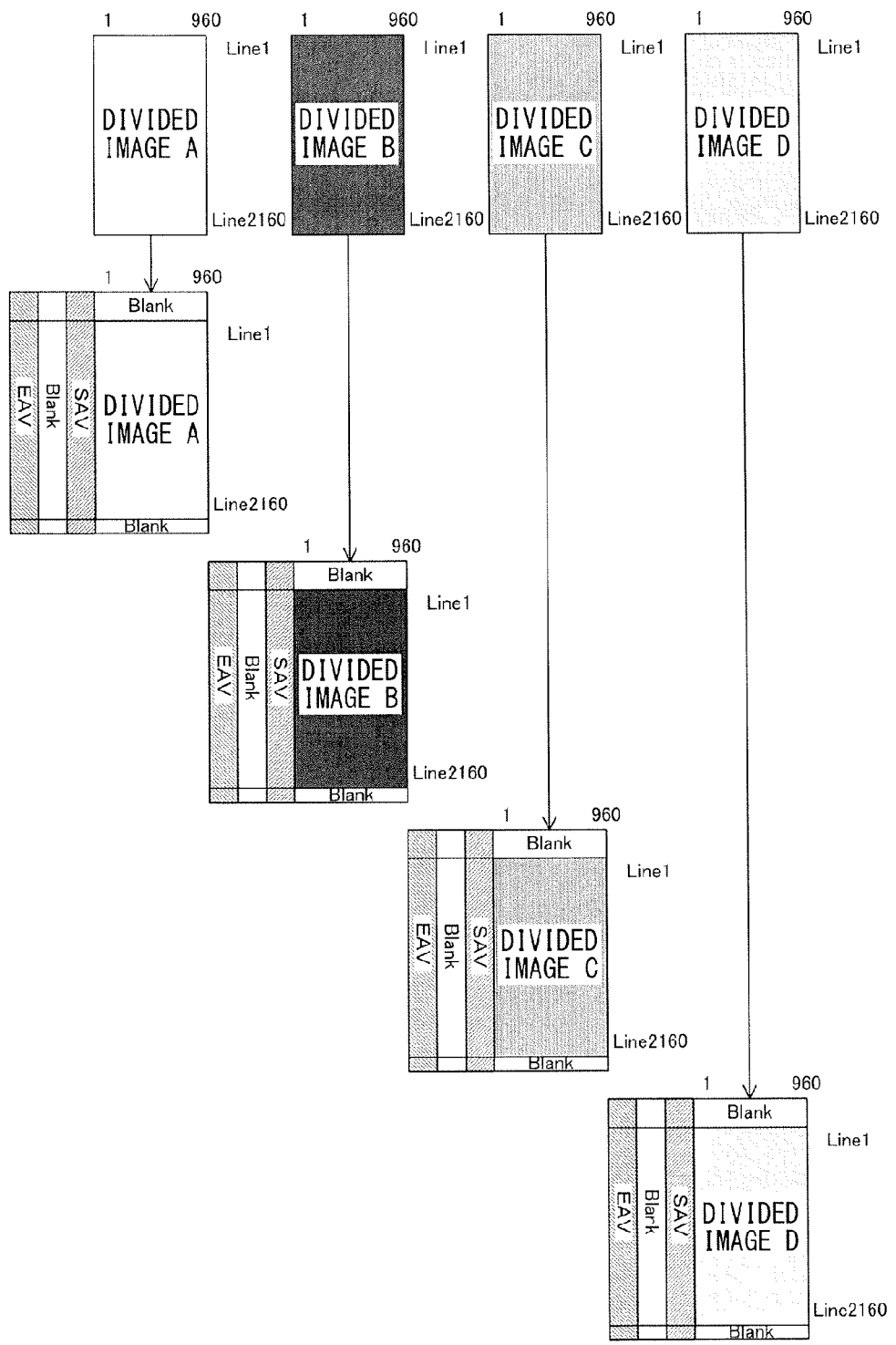
FIG. 6 is a diagram illustrating an example of divided image signals onto which synchronization signals are multiplexed in the first embodiment.

FIG. 6 is a diagram illustrating an example of the divided image signal onto which the synchronization signal is multiplexed in the first embodiment. A vertical valid picture period and a vertical blanking period are provided in the vertical direction. In the vertical valid picture period, a line is valid. In the vertical blanking period, a line is invalid. Length, a start timing, and an end timing of each of the vertical valid picture period and the vertical blanking period are determined for each format of resolution in the 3G-SDI standard.

In the vertical valid picture period, the EAV, the horizontal blanking signal, the SAV, the line number, and the error detection code are attached as the synchronization signal to each line. In FIG. 6, the line number and the error detection code are not illustrated.

The horizontal resolution of each of the divided images A, B, C, and D is 960 pixels which corresponds to ¼ of the resolution (3840 pixels) of the original image. Therefore, in the original image, the synchronization signals such as the EAV are attached to each line under a condition that one line is configured of 3840 pixels based on the standard. On the other hand, in the divided image, the synchronization signals are attached to each line under a condition that one line is configured of 960 pixels. Therefore, the interval of attaching the synchronization signals in the divided image is ¼ of that in the original image.

By attaching the synchronization signals to all of the divided images at the same timing, the pixels having the same coordinates in the respective divided images are transferred to the display device 200 at the same time.

Figure 7:
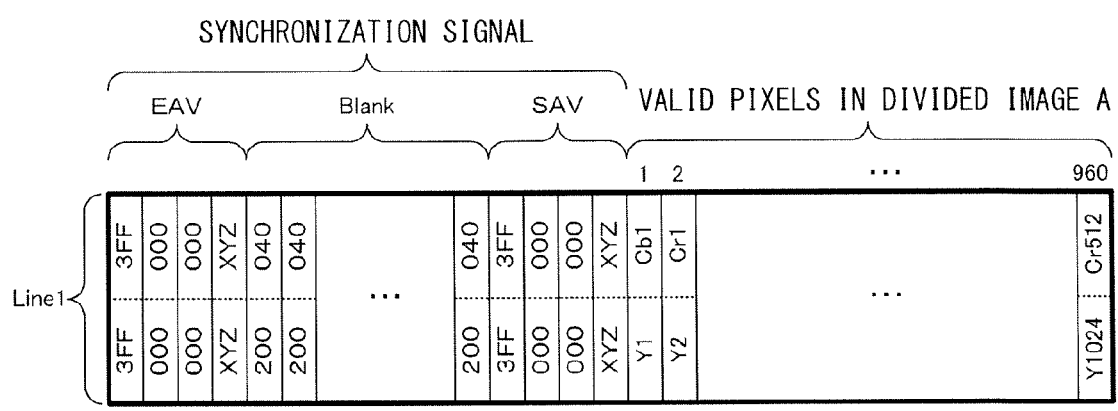
FIG. 7 is a diagram illustrating an example of a data configuration of the synchronization signal and a valid pixel signal in the first embodiment.

FIG. 7 illustrates an example of a data configuration of the synchronization signal and the valid pixel signal in the first embodiment. The synchronization signal includes the EAV, the horizontal blanking signal Blank, and the SAV. Each of the EAV and the SAV is data that includes four words of "3FF", "000", "000", and "XYZ". X, Y, and Z are each a variable, and are each set to have, for example, a value indicating the SAV or the EAV. Further, each of the valid pixels includes the luminance signal (such as a luminance signal Y1) and a color-difference signal (such as a color-difference signal Cb1).

[Operation Example of Image Supply Device]

Figure 8:
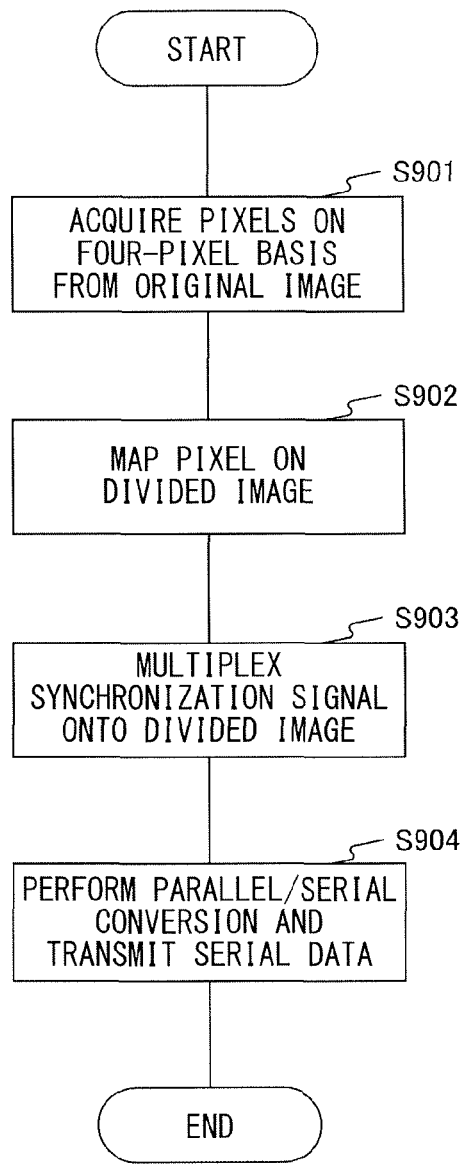
FIG. 8 is a flow chart illustrating an example of an image transmitting process performed by the image supply device in the first embodiment.

FIG. 8 is a flow chart illustrating an example of an image transmitting process performed by the image supply device 100 in the first embodiment. The image transmitting process may be executed, for example, every time the image supply device 100 acquires one original image. The image supply device 100 acquires pixels on four-pixel basis from the original image (step S901). The image supply device 100 maps the respective four pixels onto four divided images every time the image supply device 100 acquires the four pixels (step S902).

The image supply device 100 multiplexes the synchronization signal onto the divided image signal, and thereby, generates parallel data (step S903). The image supply device 100 converts the parallel data into serial data, and transmits the serial data in accordance with the 3G-SDI standard (step S904). After the step S904, the image supply device 100 completes the image transmitting process.

[Operation Example of Display Device]

Figure 9:
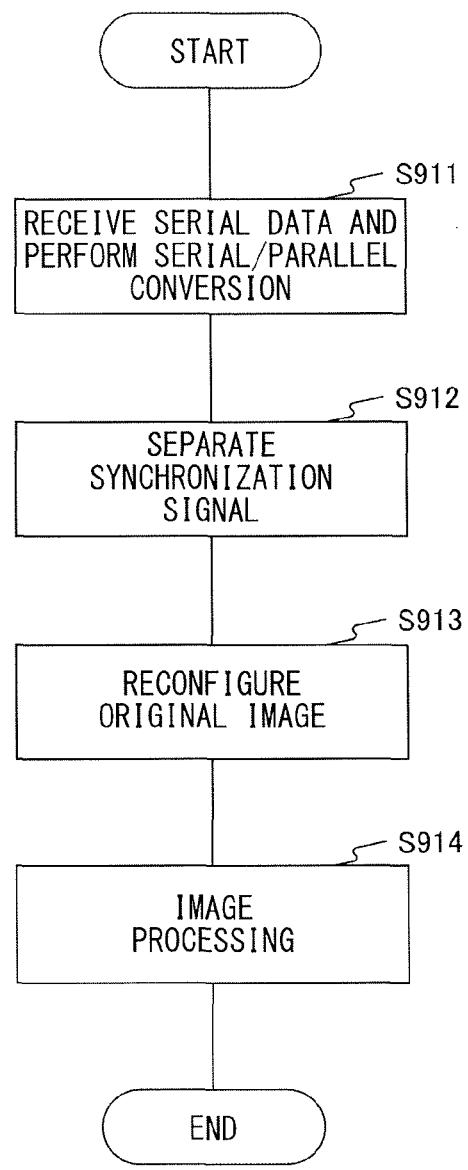
FIG. 9 is a flow chart illustrating an example of an image receiving process performed by the display device in the first embodiment.

FIG. 9 is a flow chart illustrating an example of an image receiving process performed by the display device 200 in the first embodiment. The image receiving process may be executed, for example, every time a divided image signal corresponding to one image is transmitted from the image supply device 100. The display device 200 receives the serial data in accordance with the 3G-SDI standard, and converts the serial data into parallel data (step S911). The display device 200 separates the synchronization signal from the divided image signal (step S912). The display device 200 reconfigures the original image signal from the four divided image signals (step S913). The display device 200 displays the reconfigured original image (step S914). After the step S914, the display device 200 completes the image receiving process.

In such a manner, according to the first embodiment, every time the pixels of the number equal to the dividing number are supplied to the image supply device 100, the image supply device 100 maps the respective pixels onto images different from one another. Therefore, it is not necessary to store the pixels in a memory. Accordingly, it is possible to reduce delay time and memory capacity at the time when the image is transmitted.

[Modifications]
[Configuration Example of Image Processing Device]

Figure 10:
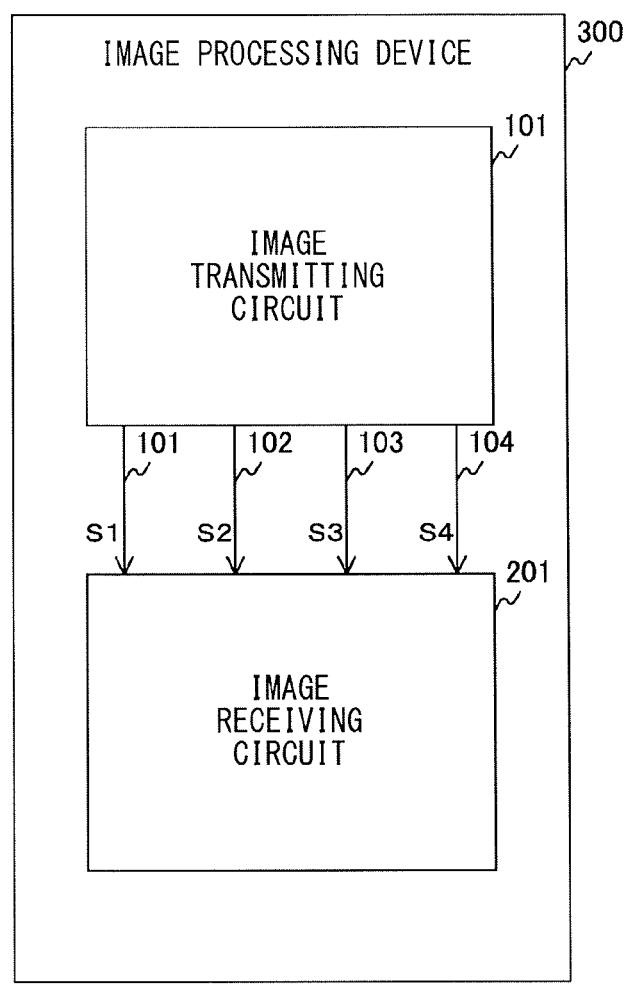
FIG. 10 is a block diagram illustrating a configuration example of an image processing device in the first embodiment.

In the first embodiment, the image is divided for transmission of the image between the devices. However, the image may be divided for transmission of the image in a device. FIG. 10 is a block diagram illustrating a configuration example of an image processing device 300 in a modification of the first embodiment. The image processing device 300 in the modification is different from the device in the first embodiment in that the image processing device 300 divides the image for transmission of an image in the device (the image processing device 300). The image processing device 300 includes an image transmitting circuit 101 and an image receiving circuit 201. The image transmitting circuit 101 is connected to the image receiving circuit 201 via signal lines 101 to 104.

The configuration of the image transmitting circuit 101 is similar to that of the image supply device 100 in the first embodiment except that the image transmitting circuit 101 transmits an image to the image receiving circuit 201 in the same device instead of the display device 200. The configuration of the image receiving circuit 201 is similar to that of the display device 200 except that the image receiving circuit 201 receives an image from the image transmitting circuit 101 in the same device instead of the image supply device 100. Specifically, the image processing device 100 may be, for example, an image pick-up device or the like, and the image transmitting circuit 101 may be, for example, an image pickup element (an image sensor) or the like. The image receiving circuit 201 may be, for example, a circuit performing image processing and image display, or the like.

2. Second Embodiment

Configuration Example of Image Supply Device

In the first embodiment, the dividing number is a fixed number. However, the minimal dividing number varies depending on the data amount of the original image. When the image is divided into "k" to be transmitted, it is necessary for the k-number of 3D-SDI transmitting sections (such as the 3D-SDI transmitting section 141), the k-number of 3G-SDI receiving sections (such as the 3G-SDI receiving section 211), etc. to operate. Therefore, power consumption increases as the dividing number k is larger. On the other hand, the data amount of the divided image per communication channel increases as the dividing number k of the original image is smaller. When the data amount of the divided image is large, the divided image may not be transmitted if the transfer clock is not high with which the synchronization signal multiplex section 131 etc. transmit the divided image as parallel data to the 3G-SDI transmitting section 141 etc. Further, when the data amount of the divided image is large, the divided image may not be transmitted if a processing clock is not high with which the 3G-SDI transmitting section 141 etc. convert the parallel data (divided image) into serial data. In order to allow the processing clock, the transfer clock, etc. to be high, it may be necessary to change design of the circuits such as the synchronization signal complex section 131 etc. and the 3G-SDI transmitting section 141 etc., or it may be necessary to newly provide a circuit that changes the clock. Therefore, the divided number k may be desirably adjusted in order not to change the transmission clock, the processing clock, etc. The second embodiment is different from the first embodiment in that the dividing number is variable depending on the data amount of the original image.

Figure 11:
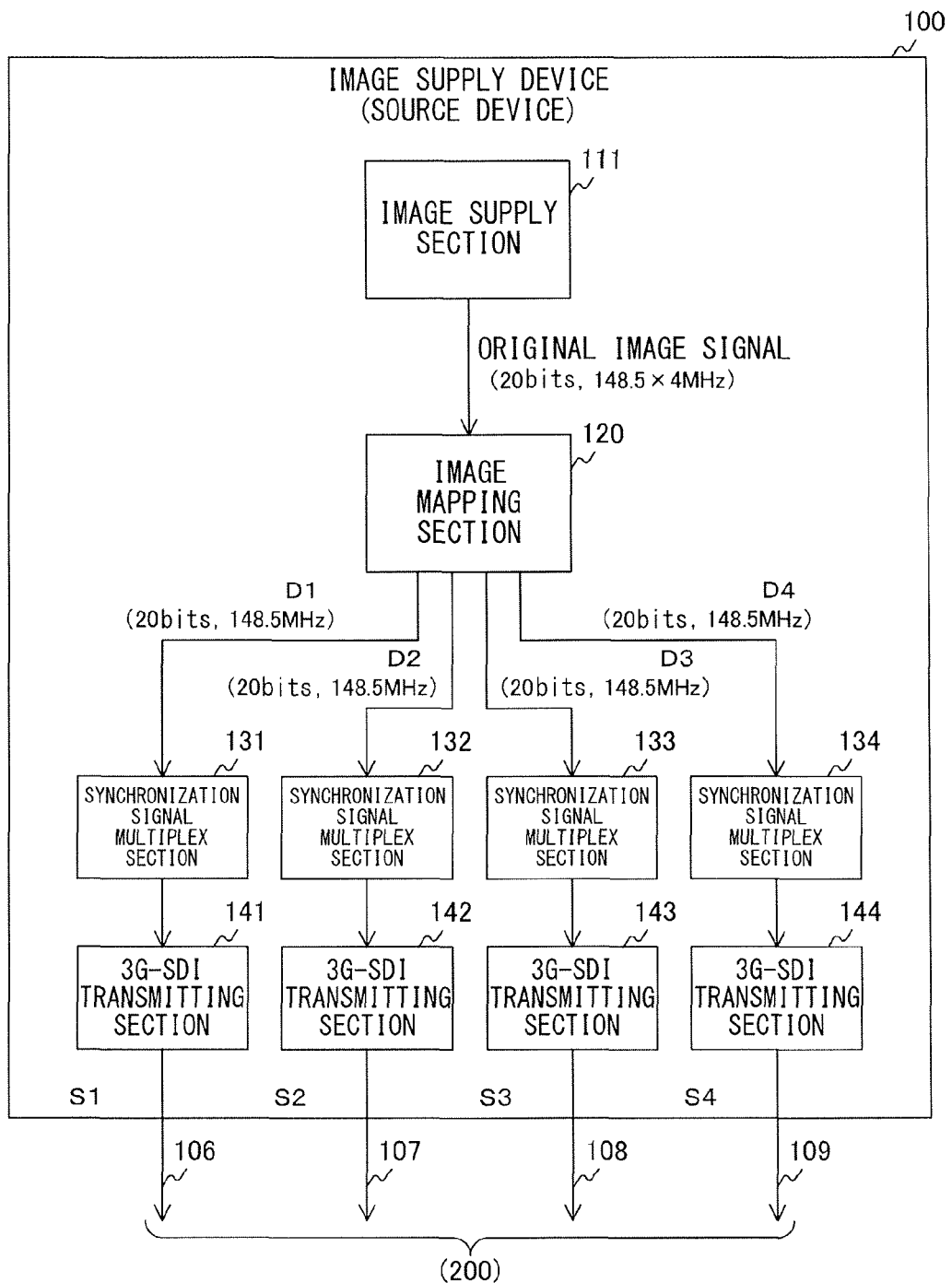
FIG. 11 is a block diagram illustrating a configuration example of an image supply device in a second embodiment.

FIG. 11 is a block diagram illustrating a configuration example of an image supply device 100 in the second embodiment. The image supply device 100 in the second embodiment is different from that in the first embodiment in that the image supply device 100 in the second embodiment includes an image supply section 111 instead of the image supply section 110. Further, an image mapping section 120 in the second embodiment is different from that in the first embodiment in that the image mapping section 120 in the second embodiment varies the dividing number depending on the data amount of the original image.

The image supply section 111 is different from the image supply section 110 in the first embodiment in that the image supply section 111 transfers the original image signal not on k-number of pixel basis but on one-pixel basis. The transfer rate of the original image signal in a case where the original image signal is transferred on one-pixel basis is k-times as large as the transfer rate in the case where the original image signal is transferred on k-number of pixel basis. It is to be noted that, in the second embodiment, the original image signal may be transferred on k-number of pixel basis to the image mapping section 120 as in the first embodiment.

[Configuration Example of Image Mapping Section]

Figure 12:
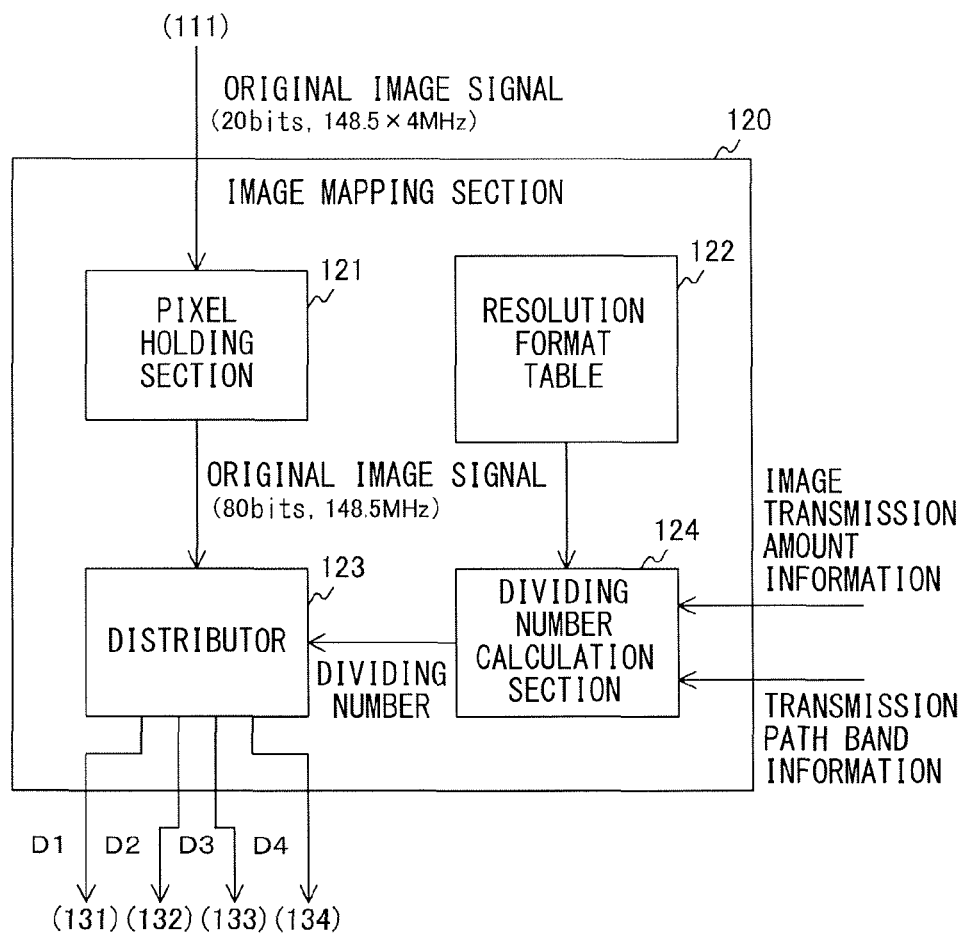
FIG. 12 is a block diagram illustrating a configuration example of an image mapping section in the second embodiment.

FIG. 12 is a block diagram illustrating a configuration example of the image mapping section 120 in the second embodiment. The image mapping section 120 includes a pixel holding section 121, a resolution format table 122, a distributor 123, and a dividing number calculation section 124.

The pixel holding section 121 holds the k-number of pixels or more pixels. The pixel holding section 121 holds the k-number of pixels every time the k-number of pixels are supplied thereto. The held pixels are read by the distributor 123. Unlike in the first embodiment, it is necessary to provide a memory (the pixel holding section 121) in the image mapping section 120. However, capacity of memory is enough to be capacity for the k-number of pixels or more, and capacity for line unit or for frame unit is not necessary. Because the k-number of pixels are held and then transmitted, transmission delay of line unit or of frame unit does not occur, and increase in delay time is suppressed.

It is to be noted that, in the second embodiment, the pixels are transferred to the image mapping section 120 on one-pixel basis. However, the pixels may be transferred on k-number of pixel basis in a manner similar to that in the first embodiment.

In this case, it is not necessary to provide the pixel holding section 121 in the image mapping section 120.

The resolution format table 122 is a table in which information related to the resolution format corresponds to each piece of resolution format identification information. The resolution format identification information is for identifying the resolution format of the original image. Examples of the information related to the resolution format may include, horizontal resolution, vertical resolution, a frame rate, a horizontal blanking period, and a vertical blanking period.

The distributor 123 divides an image by the dividing number k determined by the dividing number calculation section 124. The distributor 123 receives the dividing number k from the dividing number calculation section 124. Further, every time the k-number of pixels are held by the pixel holding section 121, the distributor 123 distributes the respective k-number of pixels to the synchronization multiplex sections (such as the synchronization multiplex section 131) different from one another. Thus, the original image is divided into the k-number of divided images.

The dividing number calculation section 124 calculates the dividing number k. The dividing number calculation section 124 receives, in advance, image transmission amount information and transmission path band information before transmission of an image. The image transmission amount information is for determining the data amount and the frame rate of the original image. The image transmission amount information may be inputted, for example, by a user or the image supply section 111 before the transmission of the image. The image transmission amount information may include, for example, resolution format identification information, color format identification information, and gradation expression bit number. The transmission path band information indicates band per channel of the transmission path between the image supply device 100 and the display device 200. As a unit of the band, for example, bps (bit per second) may be used.

The color format identification information is for identifying the color format of the original image. The gradation bit number is a bit number that represents color gradation of the original image.

The dividing number calculation section 124 determines a data size of the pixel in the original image from the color format and the gradation bit number. For example, when the color format is "YCbCr 4:4:4" and the gradation bit number is 10 bits, one pixel is configured of information of Y of 10 bits, information of Cb of 10 bits, and information of Cr of 10 bits. Therefore, the data size of the pixel is 30 bits.

Further, the dividing number calculation section 124 reads, from the resolution format table 122, the horizontal resolution, the vertical resolution, the frame rate, the horizontal blanking period, and the vertical blanking period that correspond to the resolution format. A unit of the horizontal resolution and the horizontal blanking period may be, for example, the number of pixels. A unit of the vertical resolution and the vertical blanking period may be, for example, the number of lines. A unit of the frame rate may be, for example, hertz (Hz).

The dividing number calculation section 124 may, for example, determine the dividing number k that satisfies the following expression, and may supply the determined dividing number k to the distributor 123. Accordingly, the dividing number k is determined in accordance with the data amount of the image. Further, by determining the dividing number k that satisfies Expression 1, the image supply device 100 is allowed to transmit the image without changing the transmission clock.

$$\{(\text{horizontal resolution})/k + (\text{horizontal blanking period})\} \times \{(\text{vertical resolution}) + (\text{vertical blanking period})\} \times (\text{pixel data size}) \times (\text{frame rate}) \leq (\text{transmission path band})$$ [Expression 1]

When k is determined to be a value smaller than the number (for example, "4") of the synchronization signal multiplex sections (such as the synchronization signal multiplex section 131), only the synchronization signal multiplex sections (such as the synchronization signal multiplex section 131) of the same number as the determined k (for example, "1") of the synchronization signal multiplex sections (such as the synchronization signal multiplex section 131) operate to multiplex the synchronization signal. Similarly, only the 3G-SDI transmitting sections (such as the 3G-SDI transmitting section 141) of the same number as the determined k out of the 3G-SDI transmitting sections (such as the 3G-SDI transmitting section 141) operate to transmit the divided image signal.

FIG. 13 illustrates a configuration example of the resolution format table in the second embodiment. The resolution format table holds the horizontal resolution, the vertical resolution, the frame rate, the horizontal blanking period, and the vertical blanking period corresponding to each piece of the resolution format identification information. Values determined in the UHDTV standard or the like may be used for the horizontal resolution, etc.

For example, corresponding to resolution format identification information "RF1", a format that has the horizontal resolution of "1920" pixels and the vertical resolution of "1080" lines are stored. This format has the frame rate of "24" Hz, the horizontal blanking period of "280" pixels, and the vertical blanking period of "45" lines.

[Configuration Example of Display Device]

Figure 14:
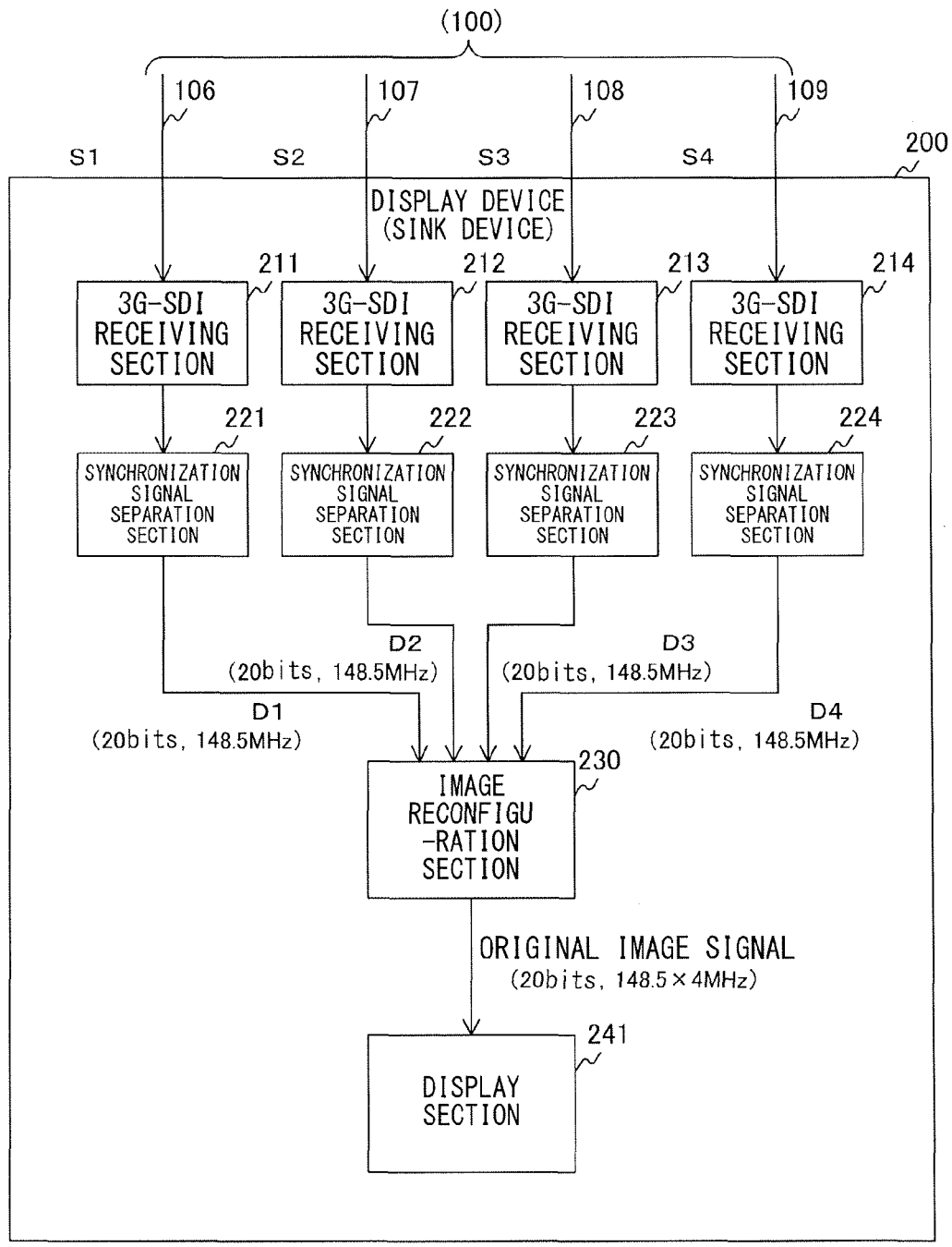
FIG. 14 is a block diagram illustrating a configuration example of a display device in the second embodiment.

FIG. 14 is a block diagram illustrating a configuration example of the display device 200 in the second embodiment. The display device 200 in the second embodiment is different from that in the first embodiment in that the display section 241 is provided instead of the display section 240.

An image reconfiguration section 230 in the second embodiment is different from that in the first embodiment in that the dividing number is acquired in accordance with the data amount of the original image and the image is reconfigured based on the dividing number.

The display section 241 acquires the pixels in the original image on one-pixel basis from the image reconfiguration section 230, and displays the acquired pixels. Because the display section 241 acquires the pixels on one-pixel basis, the display section 241 in the second embodiment operates in accordance with an operation clock that is k-times as high as that in the first embodiment in which the pixels are acquired on k-number of pixel basis. It is to be noted that the display section 241 may acquire the pixels on k-number of pixel basis in the second embodiment as in the first embodiment.

[Configuration Example of Image Reconfiguration Section]

Figure 15:
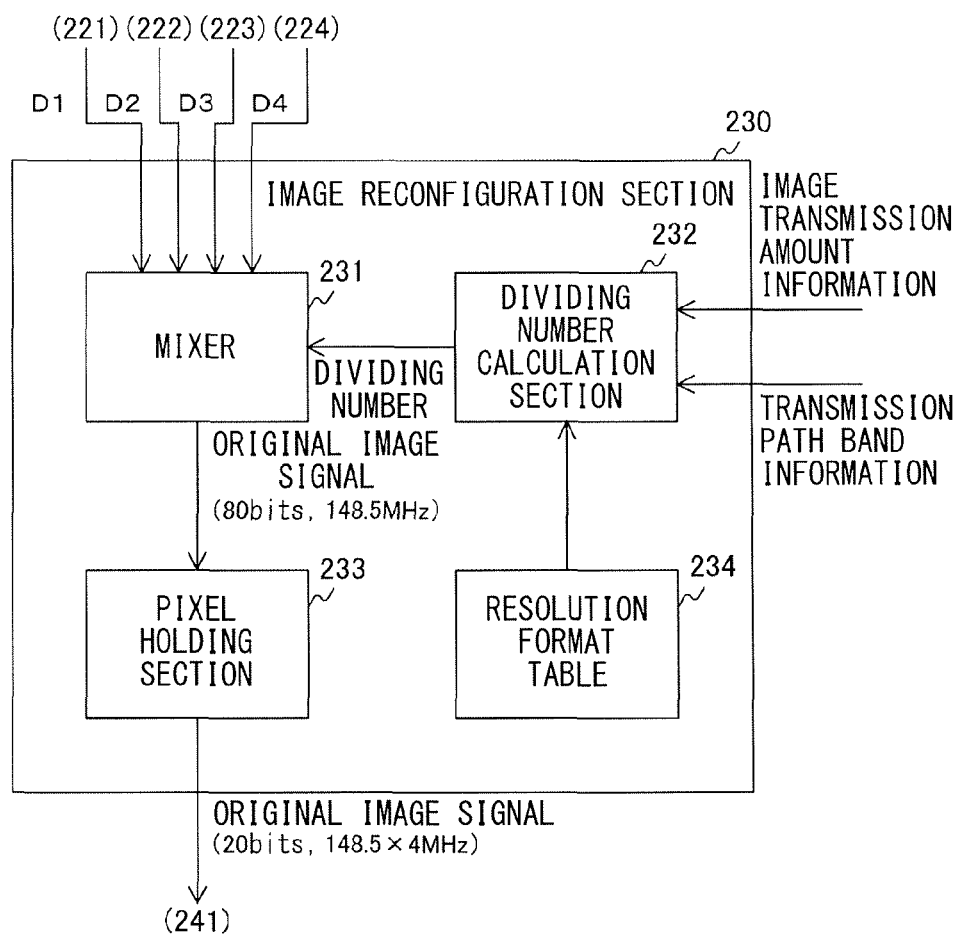
FIG. 15 is a block diagram illustrating a configuration example of an image reconfiguration section in the second embodiment.

FIG. 15 is a block diagram illustrating a configuration example of the image reconfiguration section 230 in the second embodiment. The image reconfiguration section 230 includes a mixer 231, a dividing number calculation section 232, an image holding section 233, and a resolution format table 234.

Every time the k-number of pixels are supplied to the mixer 231 from the synchronization signal separation sections (such as the synchronization signal separation section 221) of the same number of the dividing number k determined by the dividing number calculation section 232, the mixer 231 collectively supplies the supplied k-number of pixels to the display section 240. As a result, the k-number of divided images are reconfigured into the original image.

The configurations of the dividing number calculation section 232, the pixel holding section 233, and the resolution format table 234 are similar to those of the dividing number calculation section 124, the pixel holding section 121, and the resolution format table 122 in the image supply device 100, respectively.

It is to be noted that, in the second embodiment, the image reconfiguration section 230 outputs the original image on one-pixel basis. However, the image reconfiguration section 230 may output the original image on k-number of pixel basis as in the first embodiment. In this case, it is not necessary to provide the image holding section 233 in the image reconfiguration section 230.

As described above, according to the second embodiment, only the 3G-SDI transmitting sections (such as the 3G-SDI transmitting section 141) of the number determined in accordance with the data amount of the image operate in the image supply device 100. Therefore, it is possible to suppress an increase in power consumption. Further, concerning the synchronization signal multiplex sections (such as the synchronization signal multiplex section 131), the synchronization signal multiplex sections of the number based on the data amount operate, and therefore, an increase in power consumption is suppressed. Further, by varying the dividing number to retain the transmission clock number to be constant, it is possible to transmit an image without preparing a plurality of transfer clocks. Similarly, also in the display device 200, only the 3G-SDI receiving sections (such as the 3G-SDI receiving section 211), the synchronization signal separation sections (such as the synchronization signal separation section 221), etc. of the number based on the data amount operate, and therefore, an increase in power consumption is suppressed.

It is to be noted that the above-described embodiments only represent some examples for embodying the present technology, and the respective components in the above-described embodiments correspond to the elements in the claims. Also, the respective elements in the claims correspond to the components, in the above-described embodiments of the present technology, having the same names. However, the present technology is not limited to the above-described embodiments, and may be embodied by various modifications of the above-described embodiments without departing from its gist.

Moreover, the processing procedure described above in the embodiments may be considered as a method including the series of procedures, may be considered as a program for a computer to execute the series of procedures, or may be considered as a memory medium to store the program. Examples of the memory medium may include a CD (Compact Disc), a MD (MiniDisc), a DVD (Digital Versatile Disk), a memory card, and a Blu-ray disc (registered trademark).

It is possible to achieve at least the following configurations from the above-described example embodiments and the modifications of the disclosure.

(1) An image transmitting circuit including:

an image supply section configured to supply respective pixels arranged in a predetermined direction in an original image configured of pixels arranged two-dimensionally in a matrix;

an image mapping section configured to map respective dividing number of the pixels onto different images and thereby to generate divided images every time the dividing number of pixels are supplied to the image mapping section, the dividing number being a number into which the original image is divided; and transmitting sections of the dividing number or more each corresponding to one of a plurality of communication channels and configured to transmit one of the divided images via the corresponding communication channel.

(2) The image transmitting circuit according to (1), further including a dividing number determination section configured to determine the dividing number based on communication speed of the communication channel and a data amount of the original image, wherein the image mapping section generates the divided images of the determined dividing number, and only the determined dividing number of the transmitting sections out of the dividing number or more transmitting sections transmit the divided images.

(3) The image transmitting circuit according to (1) or (2), further including synchronization signal multiplex sections of the number of the transmitting sections, the synchronization signal multiplex sections each being corresponding to one of the transmitting sections, and being configured to multiplex a synchronization signal onto the divided image and to transmit the multiplexed synchronization signal and the divided image to the corresponding transmitting section, wherein only the determined dividing number of the synchronization signal multiplex sections out of the synchronization signal multiplex sections of the number of the transmitting sections multiplex the synchronization signal.

(4) The image transmitting circuit according to (2) or (3), wherein the dividing number determination section determines a number into which the original image is equally divided and that is not over the number of the communication channels as the dividing number, based on the communication speed and the data amount of the original image.

(5) An image receiving circuit including:

receiving sections of a dividing number or more each corresponding to one of a plurality of communication channels, the receiving sections each being configured to receive pixels in one of the dividing number of divided images on one-pixel basis via the corresponding communication channel, the dividing number being a number into which an original image configured of pixels arranged two-dimensionally in a matrix is divided;

an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image; and a display section configured to display the reconfigured original image.

(6) The image receiving circuit according to (5), further including a dividing number determination section configured to determine the dividing number based on communication speed of the communication channel and a data amount of the original image, wherein the determined dividing number of the receiving sections out of the dividing number or more receiving sections each receive pixels in one of the divided images on one-pixel basis, and the image reconfiguration section reconfigures the original image every time each of the determined dividing number of receiving sections acquires one pixel.

(7) The image receiving circuit according to (6), further including synchronization signal separation sections of the number of the receiving sections, the synchronization signal separation sections each being configured to separate a synchronization signal from the divided image, and to supply the divided image from which the synchronization signal is separated to the image reconfiguration section, wherein each of the receiving sections corresponds to one of the synchronization signal separation sections, receives the divided image onto which the synchronization signal is multiplexed, and supplies the received divided image to the corresponding synchronization signal separation section, and only the determined dividing number of the synchronization signal separation sections out of the synchronization signal separation sections of the number of the receiving sections separate the synchronization signal.

(8) The image receiving circuit according to (6) or (7), wherein the dividing number determination section determines a number into which the original image is equally divided and that is not over the number of the communication channels as the dividing number, based on the communication speed and the data amount of the original image.

(9) A communication system including:

an image supply section configured to supply respective pixels arranged in a predetermined direction in an original image configured of pixels arranged two-dimensionally in a matrix;

an image mapping section configured to map respective dividing number of the pixels onto different images and thereby to generate divided images every time the dividing number of pixels are supplied to the image mapping section, the dividing number being a number into which the original image is divided;

transmitting sections of the dividing number or more each corresponding to one of a plurality of communication channels and configured to transmit one of the divided images via the corresponding communication channel;

receiving sections of the dividing number or more each corresponding to one of the plurality of communication channels, the receiving sections each being configured to receive pixels in one of the divided images on one-pixel basis via the corresponding communication channel;

an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image; and a display section configured to display the reconfigured original image.

(10) A method of transmitting an image, the method including:

through an image supply section, supplying each of pixels arranged in a predetermined direction in an original image configured of pixels arranged two-dimensionally in a matrix;

through an image mapping section, mapping respective dividing number of pixels onto different images and thereby generating divided images every time the dividing number of pixels are supplied to the image mapping section, the dividing number being a number into which the original image is divided; and through transmitting sections of the dividing number or more each corresponding to one of a plurality of communication channels, transmitting one of the divided images via the corresponding communication channel.

It should be understood by those skilled in the art that various modifications, combinations, sub-combinations, and alterations may occur depending on design requirements and other factors insofar as they are within the scope of the appended claims or the equivalents thereof.

What is claimed is:

1. An image transmitting circuit comprising:

an image supply section configured to supply respective pixels arranged in a predetermined direction in an original image configured of pixels arranged two-dimensionally in a matrix;

an image mapping section configured to map respective dividing number of the pixels onto different images and thereby to generate divided images every time the dividing number of pixels are supplied to the image mapping section, the dividing number being a number into which the original image is divided;

transmitting sections of the dividing number or more each corresponding to one of a plurality of communication channels and configured to transmit one of the divided images via the corresponding communication channel; and a dividing number determination section configured to determine the dividing number based on communication speed of the communication channel and a data amount of the original image, wherein, the image mapping section generates the divided images of the determined dividing number, and only the determined dividing number of the transmitting sections out of the dividing number or more transmitting sections transmit the divided images.

2. The image transmitting circuit according to claim 1, further comprising synchronization signal multiplex sections of the number of the transmitting sections, the synchronization signal multiplex sections each corresponding to one of the transmitting sections, and configured to multiplex a synchronization signal onto the divided image and to transmit the multiplexed synchronization signal and the divided image to the corresponding transmitting section, wherein only the determined dividing number of the synchronization signal multiplex sections out of the synchronization signal multiplex sections of the number of the transmitting sections multiplex the synchronization signal.

3. The image transmitting circuit according to claim 1, wherein the dividing number determination section determines a number into which the original image is equally divided and that is not over the number of the communication channels as the dividing number, based on the communication speed and the data amount of the original image.

4. An image receiving circuit comprising:

receiving sections of a dividing number or more each corresponding to one of a plurality of communication channels, the receiving sections each being configured to receive pixels in one of the dividing number of divided images on one-pixel basis via the corresponding communication channel, the dividing number being a number into which an original image configured of pixels arranged two-dimensionally in a matrix is divided;

an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image;

a display section configured to display the reconfigured original image; and a dividing number determination section configured to determine the dividing number based on communication speed of the communication channel and a data amount of the original image, wherein the determined dividing number of the receiving sections out of the dividing number or more receiving sections each receive pixels in one of the divided images on one-pixel basis, and the image reconfiguration section reconfigures the original image every time each of the determined dividing number of receiving sections acquires one pixel.

5. The image receiving circuit according to claim 4, further comprising synchronization signal separation sections of the number of the receiving sections, the synchronization signal separation sections each being configured to separate a synchronization signal from the divided image, and to supply the divided image from which the synchronization signal is separated to the image reconfiguration section, wherein, each of the receiving sections corresponds to one of the synchronization signal separation sections, receives the divided image onto which the synchronization signal is multiplexed, and supplies the received divided image to the corresponding synchronization signal separation section, and only the determined dividing number of the synchronization signal separation sections out of the synchronization signal separation sections of the number of the receiving sections separate the synchronization signal.

6. The image receiving circuit according to claim 4, wherein the dividing number determination section determines a number into which the original image is equally divided and that is not over the number of the communication channels as the dividing number, based on the communication speed and the data amount of the original image.

7. A communication system comprising:

an image supply section configured to supply respective pixels arranged in a predetermined direction in an original image configured of pixels arranged two-dimensionally in a matrix;

an image mapping section configured to map respective dividing number of the pixels onto different images and thereby to generate divided images every time the dividing number of pixels are supplied to the image mapping section, the dividing number being a number into which the original image is divided;

transmitting sections of the dividing number or more each corresponding to one of a plurality of communication channels and configured to transmit one of the divided images via the corresponding communication channel;

receiving sections of the dividing number or more each corresponding to one of the plurality of communication channels, the receiving sections each being configured to receive pixels in one of the divided images on one-pixel basis via the corresponding communication channel;

an image reconfiguration section configured to sequentially arrange respective pixels received by the receiving sections in a predetermined direction in the original image every time each of the dividing number of receiving sections out of the dividing number or more receiving sections receives one pixel, and to reconfigure the original image;

a display section configured to display the reconfigured original image; and a dividing number determination section configured to determine the dividing number based on communication speed of the communication channel and a data amount of the original image.

8. A method of transmitting an image, the method comprising:

through an image supply section, supplying each of pixels arranged in a predetermined direction in an original image configured of pixels arranged two-dimensionally in a matrix;

through an image mapping section, mapping respective dividing number of pixels onto different images and thereby generating divided images every time the dividing number of pixels are supplied to the image mapping section, the dividing number being a number into which the original image is divided;

through transmitting sections of the dividing number or more each corresponding to one of a plurality of communication channels, transmitting one of the divided images via the corresponding communication channel; and through a dividing number determination section, determining the dividing number based on communication speed of the communication channel and a data amount of the original image, wherein the image mapping section generates the divided images of the determined dividing number, and only the determined dividing number of the transmitting sections out of the dividing number or more transmitting sections transmit the divided images.

* * * * *